(No Model.)

3 Sheets—Sheet 1.

S. M. LILLIE.
PROCESS OF UTILIZING THE WASTE HEAT FROM BONE BLACK REVIVIFYING KILNS.

No. 337,411.

Patented Mar. 9, 1886.

WITNESSES
John Kears
Jacob C. Knench

INVENTOR
S. Morris Lillie (No Model.) 3 Sheets—Sheet 3.

S. M. LILLIE.
PROCESS OF UTILIZING THE WASTE HEAT FROM BONE BLACK REVIVIFYING KILNS.

No. 337,411. Patented Mar. 9, 1886.

WITNESSES
John Kears
Jacob C. Muench

INVENTOR
S. Morris Lillie

UNITED STATES PATENT OFFICE.

S. MORRIS LILLIE, OF PHILADELPHIA, PENNSYLVANIA.

PROCESS OF UTILIZING THE WASTE HEAT FROM BONE-BLACK-REVIVIFYING KILNS.

SPECIFICATION forming part of Letters Patent No. 337,411, dated March 9, 1886.

Application filed June 23, 1885. Serial No. 169,587. (No specimens.)

*To all whom it may concern:*

Be it known that I, S. MORRIS LILLIE, a citizen of the United States, residing at Philadelphia, in the county of Philadelphia and the State of Pennsylvania, have invented a new and useful process of utilizing the waste heat of bone-black-revivifying kilns of sugar-refineries in drying bone-black preparatory to its being passed through the retorts of the kiln, and in heating water or other liquids for the purposes of the refinery, of which (the said process) the following is a specification, reference being had to the accompanying drawings.

My process consists, first, in drawing or forcing the products of combustion of the kiln through the wet black contained in suitable receptacles, the products of combustion being first cooled to a degree by mixing them with cooler air or gases, so that the danger of igniting the black may be lessened; second, in drawing warm air from around the kiln through moist black contained in other suitable receptacles, by which the black is more or less dried and the air cooled and laden with moisture, and in using the air thus cooled and moistened for mixing with and cooling the products of combustion, as above set forth; and, third, it consists in collecting the steam generated in the retorts of the kiln and in the drier, and in using the same for heating water or for heating or evaporating sugar solutions.

The apparatus for practicing my process consists of a drier located above the kiln, and of exhausting apparatus connected with the drier and with the retorts of the kiln for drawing air and products of combustion through the wet black in the drier, and for exhausting the steam formed in the retorts from the same. It also comprises suitable condensers for utilizing the vapors and steam drawn from the black in heating water or in heating or evaporating sugar solutions.

Figure 1:
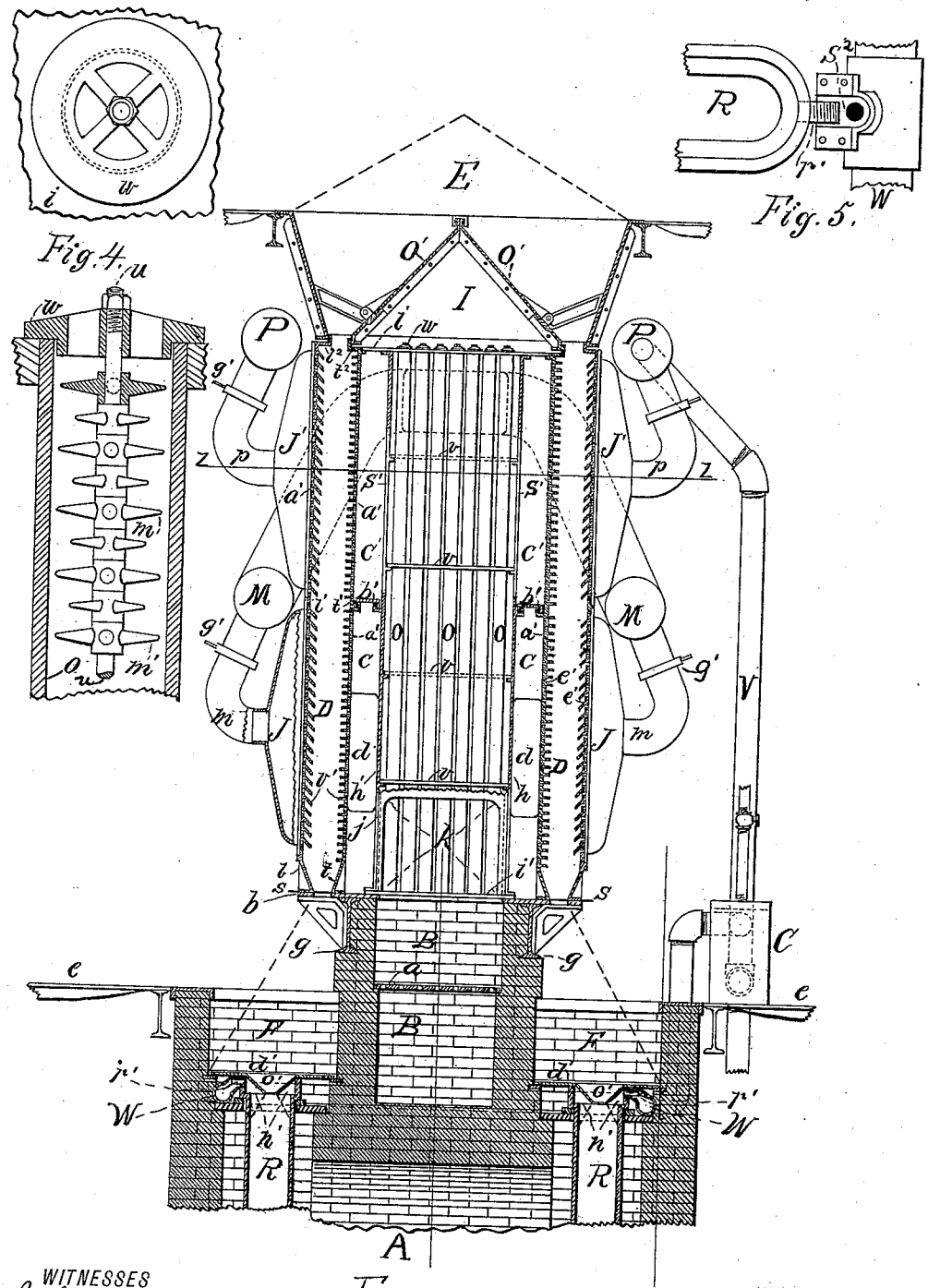
Figure 2:
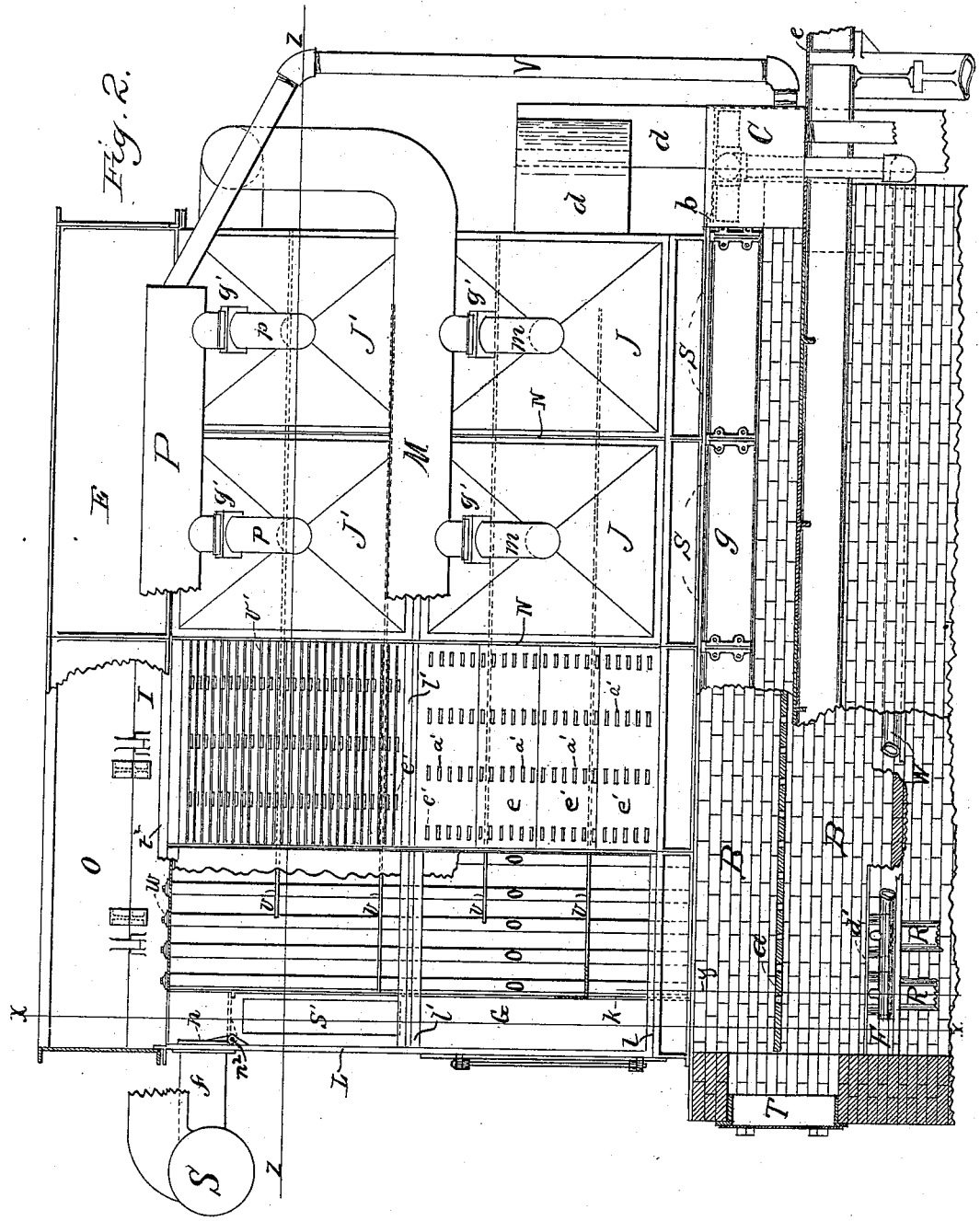
Figure 3:
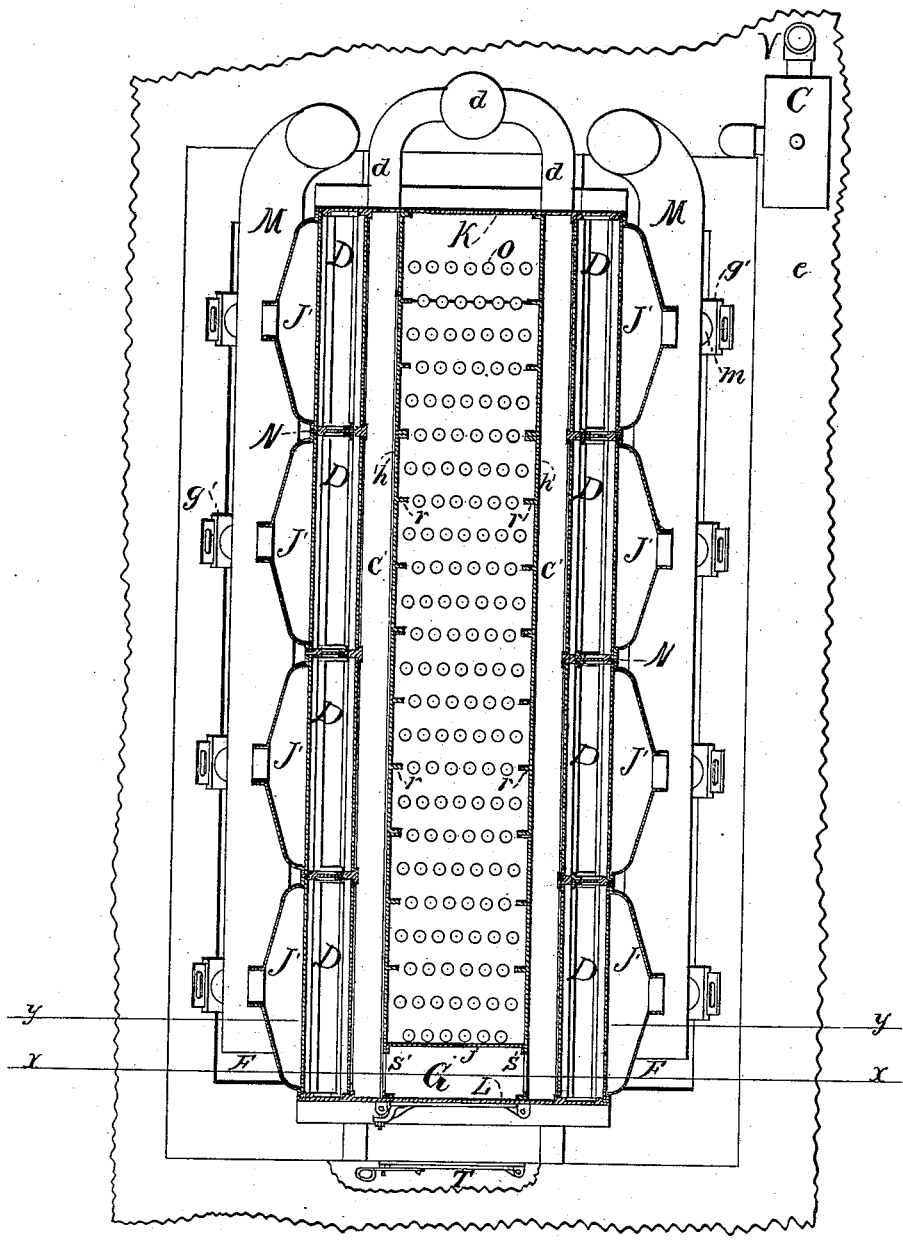

The apparatus is illustrated in the drawings, of which Figure 1 is a vertical transverse section of the drier along the broken line $x$, and of the upper portion of the kiln along the broken line $y$, Fig. 2. Fig. 2 is a side elevation of the drier and of the upper portion of the kiln, with portions of each broken away to disclose the interior construction. Fig. 3 is a horizontal section through the drier along the broken line $z$, Figs. 1 and 2, while the other figures are views of details.

In the drawings, A is the fire-chamber of the kiln, having one or more rows of retorts, R, ranged on each side in the usual manner. B is a longitudinal flue above the fire-chamber, with which the fire-chamber connects by suitable flues (not shown) containing dampers, by which the draft of the fire is regulated. The flue B is divided into two by the horizontal perforated diaphragm $a$, which tends to distribute the products of combustion from the kiln equally among the tubes of the surface-heater, presently to be mentioned.

Upon the girders $g$ and the walls of the flue B rests the bed-plate $b$, upon which is built the drier. The drier consists of a surface-heater resting upon the bed-plate over a central longitudinal opening in the same; of the channels D, with perforated walls on each side for the black to be dried, opening above into a hopper, E, and below through passages in the bed-plate, provided with slides $s$, into boxes F, into which the upper ends of the retorts R open; of the hoods J, covering the outside perforated walls of the channels D; of the air-passages $c$ $c'$ on each side between the surface-heater and the black-channels D; of the vertical channel G between the end of the surface-heater and the front plate of the drier, and of the horizontal flue I between the upper tube-plate of the surface-heater and the plates of the hopper E, which flue communicates either through the passage $f$ with an exhausting apparatus or with the vertical channel G, depending upon the position of the damper $n$, which, in its normal position, closes the passage $f$, as shown.

The surface-heater consists of a battery of tubes, $o$, opening above and below, respectively, through the tube-plates $i$ $i'$, and contained in the chamber formed by the said tube-plates, the vertical walls $h$ $h'$, extending from end to end of the drier, the rear end plate, K, of the drier, and the vertical partition $j$, extending between the partitions $h$ $h'$ a short distance from the front end plate L, of the drier.

In the interior of the heater are contained horizontal partial diaphragms $v$ through which the tubes extend with a snug fit, the diaphragms being located equally distant from each other and from the tube-plates $i$ $i'$, and touching alternately the end plates, $j$ K, of the heater, thus forming a longitudinally-zigzag channel back and forth among the tubes, the upper extremity of which communicates through the rear end plate, K, of the heater and drier with the mains M, while the lower extremity communicates with the vertical chamber G by an opening, $k$, through the front end plate of the heater. The rows of tubes $o$ break spaces with each other in the direction of the length of the heater, and the side walls, $h$ $h'$, bear vertical ledges $r$, which project out between the rows of tubes, so that there are no unobstructed channels through the heater longitudinally, as a result of which gases or vapors that are made to flow along the zigzag channel of the surface-heater must repeatedly impinge upon and flow around in contact with the heated surfaces of the tubes, which form the conditions the most favorable to the transfer of heat from the tubes to the gases or vapors. Each tube $o$ is closed above by a cap, $w$, having perforations in it, from the center of which depends a rod into the interior of the tube, on which rod are slipped star-shape pieces $m'$, as shown in Fig. 4, which is a vertical axial section of one of the tubes $o$, formed of cast-iron, earthenware, or other material. These pieces, suspended in the interior of the tubes, serve the purpose of absorbing heat from the hot products of combustion which flow up through the tubes, and of radiating it to the walls of the tubes, by which it is absorbed, conducted, and delivered to the moist air, which, during the operation of the drier, is flowing through the heater along the zigzag channel, all as is hereinafter set forth.

The hollow side walls of the drier are each formed of a framing consisting of the vertical divisional plates M, which divide the hollow side walls each into four char-channels, D, and of the horizontal framing-pieces $l$ $l'$ $l^2$ of the front wall, and $t$ $t'$ $t^2$ of the inner wall.

The divisional plates M and framing-pieces $t$ and $l$ divide the outer and inner walls into panels—two to each channel D—which panels are each filled with plates $e'$, which rest in rabbets formed on the edge of the framing-pieces and divisional plates, and which are held in position in any suitable manner. These plates are each perforated by a number of horizontal rows of vertically-narrow slots, $a'$, and bears on its inner surface a ledge or narrow shelf, $v'$, above each row of slots, which shelf prevents the black with which in practice the space between the walls is filled from flowing through the slots.

Each of the panels of the outer wall is covered air-tight by a hood, J, the lower set of hoods J on each side communicating by a central opening in each and by the branch mains $m$ and mains M through the rear end of the drier with the interior of the surface-heater above the upper partial diaphragm $v$, while the upper set of hoods, J', communicate through the branches $p$ and main P with the large main S, which leads to an exhausting-fan and condenser. (Not shown.)

The branch mains $m$ and $p$ are each provided with a gate, $g'$. The spaces between the hollow side walls, respectively, and the surface-heater are each divided into two compartments, $c$ $c'$, by the horizontal partition $b'$, extending from end to end of the drier on a level with the middle horizontal member, $t'$, of the side-wall frame, of which compartments the lower one, $c$, on each side communicates through a main, $d$, with the space underneath the flooring $e$, while the upper one, $c'$, communicates by a passage, $s'$, through the extended heater-walls $h$ with a vertical channel, G, at the end of the drier, which latter also communicates at the bottom, by the passage $k$ through the end of the surface-heater, with the interior of the same below the lower diaphragm $v$, as hereinbefore described, and above with the flue I, above the surface-heater, supposing the damper $n$ to be open, as shown in the drawings. When this damper $n$, which revolves on an arbor, $n^2$, is lowered or closed, the communication between the chamber G and the flue I is closed, and the latter then communicates through the passage $f$ with the exhausting-main S, by which the draft for the kiln-fire is then produced. The inclined plates O' O' above the flue I, and forming a part of the hopper E, are each divided along a horizontal line, and the parts hinged, thus forming doors or wings, which, when thrown back, permit access to the surface-heater tubes $o$. By means of a door, T, at the end of the flue B access may be had to the latter. The mouths of the retorts R are covered with a plate or plates, $d'$, having funnels $o'$, leading one into the interior of each retort, and through which the black flows into the latter. In each retort there is an annular space, $n'$, formed between the upper surface of the black in the retort, (indicated by the dotted line in the drawings, Fig. 1,) the walls of the retort, and the conical funnels $o'$. This space $n'$ in each retort communicates through a branch, $r'$, and socket $s^2$ (see in detail, Fig. 5) with the main W, which communicates through a surface or spray condenser, C, and mains V P, &c., with the exhausting apparatus. The condenser C is provided with a water (or sugar solution) connection for condensing the steam brought to it through the main W. When the kiln and drier are in operation, the steam and gases which are generated in the retorts rise through the black and collect in the annular space $n'$, from which they are drawn through the manifolds W to the condenser C, in which the water-vapor is condensed by the water or sugar solution flowing through the condenser, with the effect of heating the latter, while the uncondensable gases are carried off through the mains V P, &c.

The operation of the above-described apparatus and the advantages of the same may be set forth as follows, at first stating, however, that during the drying and the revivification of the bone-black by this drier and kiln the retorts R and the channels D are always filled with black, that the black lies in the hopper E and in the boxes F, as indicated by the dotted lines, and that there is a slow movement of the black (which is fed into the hopper E) downward through the channels D and retorts R, due to a uniform or intermittent drawing of the black from the bottoms of the retorts, or, rather, from the cooler-tubes, with which the retorts terminate below. Supposing, now, the exhausting-fans to be in motion, the products of combustion are drawn from the fire-chamber of the kiln into the lower compartment of the horizontal flue B, thence through the distributing-plate $a$, upward through the tubes $o$ of the surface-heater $w$ (surrendering, during their passage, their heat to the heat-arresters $m'$ and to the walls of the tubes) into the flue I, thence into the vertical chamber G, where it mingles with moist air which has been drawn warm from below the floor $e$ (under which collects the air heated by contact with the walls and other parts of the kiln and by the radiant heat from the same) into the air-passages $c$, thence through the black in the lower portion of the channels B, partially drying the black and being itself cooled and laden with moisture, then through the hoods J, branches $m$, and mains M, into and through the surface-heater, entering the latter above the upper partial partition $v$, flowing back and forth around the partial partitions until it issues from the heater below the lower partition into the vertical chamber G, where it meets and mingles with the products of combustion and with them flows through the opening $s'$ in the vertical partitions $h$ into the air-passages $c'$, and thence through the black in the upper portion of the chamber D into the hoods J', and then through the branches $p$ and mains P to the mains S, which lead to the exhausting apparatus and to a condenser, (not shown,) in which latter the warm vapors with which the air and gases are laden are condensed by cold water, which is heated to a degree thereby preparatory to being further heated and used in the refinery. The steam formed by the evaporation of water from the black while in the retorts R is exhausted from the retorts through the branches $r'$ into the cross main or manifold W, thence through the condenser C, in which it is used for heating water or sugar solutions or for evaporating sugar solutions, if suitably-constructed evaporating apparatus be substituted for the condenser C. The air and the products of combustion in their passage through the black, as described, evaporate and bear away with them much of the moisture contained in the black, which in consequence is comparatively dry when it passes from the drier into the boxes F and retorts R. The desiccation is partially effected in the upper portions of the channels D by the mixed air and products of combustion, after which a further portion of the moisture is removed by the warm air drawn through the same black while in the lower sections of the channels. Any moisture remaining in the black after it leaves the drier is driven from it while in the retorts R, the resulting vapor passing from the retorts to the condenser C, as hereinbefore described.

By means of the gates $g'$ in the branch mains $m$ $p$ the volume of air and gases drawn through the black back of the various hoods may be regulated, so as to cause the relative percentages of moisture in the black issuing from the lower ends of the four channels D in each hollow side wall of the drier to be anything desired. For example, if it should be found that certain retorts of the kiln burn the black less effectively than others, then the gates $g'$ should be so set that more gases and air shall be drawn through the black-channels D which deliver black to those retorts than through the channels which deliver to the more effective retorts, as a result of which the black which flows through the former into the less effective retorts will be drier than that which flows from the latter into the more effective retorts, and so it is that by dividing the passages for the black in a drier into a number of independent channels, and by having the desiccation in each channel under control independently of the others, as is the case in this drier, differences in the effectiveness of the retorts in the kiln may be compensated for in the drier by properly regulating the desiccation in the various channels.

My process contemplates, and I prefer, drawing the products of combustion through the black, for thereby the heat in the same may be more comprehensively utilized in drying black than by any other method that I know of, and also because the products of combustion have comparatively little oxidizing-power, and are consequently less liable to destroy the carbon of the bone-black by oxidization than is the case with air heated to the same temperature. Should it occur, however, that the fuel being used at any time was of such a character that it would be injurious to the black to pass the products of combustion through it, the construction of my drier is such that they may be passed from the drier in another way than through the black, and the heat in the products of combustion be utilized only in heating air in a surface-heater, which heated air is afterward drawn through the black. This may be done by lowering the damper $n$, (see Fig. 2,) which closes the communication between the flue I and the vertical chamber G and allows the products of combustion to pass through the connecting-main $f$ to the exhausting-main S, while the air which has been reheated in the surface-heater by the products of combustion is alone drawn through the black into the upper hoods, J'.

If a constant supply of a proper fuel—such as a good anthracite—could be assured, the surface-heater might be dispensed with and the moist air from the lower hoods, J, be mixed directly with the products of combustion in a suitable chamber, such as would be left by the removal of the tubes o of the surface-heater, and the mixture drawn through the black. When the products of combustion are passed through the black, the draft for the kiln-fire is necessarily an artificial one. When the products of combustion are only used in a surface-heater for heating air to be drawn through the black, the draft should also be an artificial one, if it is desired that the heat in the products of combustion should be utilized in drying black to the greatest extent possible, for otherwise the gases could not be cooled below the degree necessary to produce naturally—i.e., by chimney—the draft required for the fire, while with an artificial draft the gases may be cooled to a much lower degree and the heat utilized. The artificial draft, in the latter case, may be effected by delivering air under pressure into a closed ash-pit or by exhausting from above, which exhausting may be done by the same apparatus that draws the air through the black, as exemplified in the drawings, or by independent exhausting apparatus, such as a fan or the chimney of other furnaces—that of the boilers of the refinery, for example.

My method also contemplates, as hereinbefore set forth, the employment of air for mixing with and cooling the products of combustion prior to drawing them through the black, which, having been drawn warm from below the floor e, is passed through the partially-dried black in the lower portion of the drier, and thereby cooled and laden with moisture to a degree, the advantages of which proceeding will appear from the following considerations: It is desirable to utilize the heat in the hot air which rises from around the kiln and collects under the floor e, as well as that which is contained in the hot products of combustion, and this can be done either by drawing the air and products of combustion through the black separately or by mixing the air with the hot products of combustion and drawing the mixture through. If the first method is followed, the ignition of the black and the destruction of its carbon by the hot products of combustion may be relied upon, for although the products of the combustion may be drawn with safety through the black at a higher temperature than air, on account of their lesser oxidizing-power, they cannot be thus drawn through at the high temperature at which they enter the drier without great danger. If the second method is followed, there is still imminent danger of igniting and destroying the black, particularly in the lower portion of the drier, where the black is comparatively dry, as the mixture will be too hot to be drawn through the black without risk unless my system of first abstracting and utilizing the heat from the hot air is followed, or unless an excessive amount of the cooling-air is used. Following my system, the hot air drawn from below the floor e is not only cooled to a comparatively low temperature by being drawn through the black in the lower part of the drier, but is also laden to a degree with moisture abstracted from the black, and in this condition has a much greater cooling effect on the products of combustion when mixed with them than before, both on account of its lower temperature and of the added moisture, which latter also plays the part of a dilutant of the air and mixture and reduces its oxidizing-power. This mixture can be drawn through the moist black in the upper part of the drier without danger to the carbon and without having used an excessive amount of the cooling-air. When the products of combustion are not drawn through the black, but are used only in a surface-heater for heating air to be passed through the black, a similar advantage attends drawing the hot air from beneath the floor e first through the black in the lower part of the channels D and then through the surface-heater—namely, that owing to its lower temperature and its contained moisture it will, when reheated by the surface-heater, be of lower temperature and be less likely to destroy the carbon of the black than would be the case if drawn from below the floor e immediately through the surface-heater. An important result of the presence of the moisture in the air in this case is, that it renders the latter more absorbent of radiant heat, and therefore more effective in abstracting heat from the products of combustion in the surface-heater, for, as is well known, dry air and dry elementary gases cannot be heated by radiant heat, but only by contact, but are good absorbers of radiant heat when moist; and so it follows that by first passing the air through the black and moistening it the radiant heat within the heater is made available for heating the air, and with a given-sized heater a greater proportion of heat may be absorbed from the products of combustion and utilized than if the air were not first moistened in this way. The efficiency of the heater could likewise be increased by arranging "heat-arresters" among the tubes similar to those in the interior of the tubes, which arresters would absorb the heat radiated from the tubes and give it up again by contact or conduction to the air passing through the heater. The presence of such heat-arresters would be of especial importance were the air passing through the heater dry, and therefore only capable of being heated by contact.

It is to be observed, as an important feature of my process, that the hotter mixture of the products of combustion and air and the reheated air when it is used by itself are only drawn through the black which is wettest and most difficult to ignite—namely, that in the upper portion of the channels D—while the cooler air from below the floor e is alone drawn through the partially-dried and more easily ignited black in the lower portions of the drier; and it is to be borne in mind, in connection with the above remarks concerning the destruction of the carbon of the bone-black, that in proportion as more of the moisture of the black is removed from it in the drier and less of it in the retorts R the temperature of the products of combustion as they enter the drier and that of the reheated air from the surface-heater will be higher, as less heat will be absorbed from the products of combustion in the kiln, and therefore the more perfect the desiccation in the drier the greater will be the need for such precautions being taken as are to be found in this process and drier to prevent the ignition and destruction of the carbon of the black by the gases and air drawn through it.

Thus having described my invention, I claim as mine and wish to secure to myself by Letters Patent of the United States—

1. The within-described process of utilizing the heat in the gaseous products of combustion escaping from the furnaces of bone-black-revivifying kilns containing retorts for the bone-black heated externally by the said furnace, consisting in passing the products of combustion, after leaving the kiln-furnace, through wet black to dry the same before and preparatory to its introduction into the retorts of the kiln, substantially as specified.

2. The within-described process of cooling the gaseous products of combustion of the char-revivifying kilns of sugar-refineries preparatory to drawing them through bone-black for the drying of the same, consisting in mixing with them a proportion of cooler air, substantially as specified.

3. The within-described process of cooling the gaseous products of combustion of the char-revivifying kilns of sugar-refineries preparatory to drawing them through bone-black for drying the same, consisting in mixing with them a proportion of air which has been laden with moisture by being drawn through wet black or otherwise, substantially as specified.

4. The process of drying bone-black preparatory to passing it through the retorts of a kiln, consisting in first drawing through it the gaseous products of combustion from the kiln, by which it is partially dried, and then in additionally drying it by drawing through it the warm air from around the kiln, substantially as specified.

5. The process of utilizing the gaseous products of combustion from bone-black-revivifying kilns, consisting in using them first in a surface-heater for heating air, and in then passing the partially-cooled products of combustion through moist black for the purpose of drying the same, substantially as specified.

6. The within-described process of utilizing the waste heat of bone-black-revivifying kilns for drying black, consisting in drawing the warm air from around the exterior of the kiln through moist black, in then drawing the moistened and more or less cooled air through a surface-heater, in which it is reheated by the products of combustion from the kiln, and in finally passing the reheated air again through moist black, either by itself or mixed with the products of combustion, substantially as specified.

7. The within-described method of increasing the absorbent power for radiant heat of air which is to be heated in a surface-heater, consisting in moistening the air before passing it through the heater.

8. The process of utilizing the waste heat from the bone-black-revivifying kilns of sugar-refineries, consisting in drawing separately through the black the heated air rising from around the kiln, cooler-tubes, &c., and air heated by the waste products of combustion, substantially as specified.

9. The within-described process of removing the vapors generated in the retorts of bone-black kilns, consisting in exhausting the vapors from the retorts through a suitable connecting main or mains, substantially as specified.

10. The process of utilizing the steam generated in the retorts of a bone-black-revivifying kiln, consisting in collecting the steam from the various retorts and in using it in suitable condensers or evaporating apparatus for heating water or for heating or evaporating sugar solutions, substantially as specified.

11. The employment of an artificial draft for the fire of a bone-black-revivifying kiln when the products of combustion from the same are cooled in a surface-heater in heating air, vapors, or gases, which are to be drawn through moist bone-black to dry the same preparatory to being passed through the retorts of the kiln, substantially as specified.

12. The process of compensating for the differences in the effectiveness of the various retorts of a kiln in burning black, consisting in delivering the black in a drier condition to the less effective retorts than to the more effective ones, substantially as specified.

S. MORRIS LILLIE.

Witnesses:
 WM. H. FRY,
 JACOB C. MUENCH.